US005557184A

United States Patent [19]
Hwang

[11] Patent Number: 5,557,184
[45] Date of Patent: Sep. 17, 1996

[54] SPINDLE MOTOR CONTROLLING CIRCUIT OF AN OPTICAL DISK SYSTEM

[75] Inventor: Yong-Ha Hwang, Seoul, Rep. of Korea

[73] Assignee: Samsung Electronics Co., Ltd., Kyungki-do, Rep. of Korea

[21] Appl. No.: 100,817

[22] Filed: Aug. 2, 1993

[30] Foreign Application Priority Data

Oct. 1, 1992 [KR] Rep. of Korea .................. 18018/1992

[51] Int. Cl.[6] .................................................. G05B 1/06
[52] U.S. Cl. ........................ 318/608; 318/632; 388/805
[58] Field of Search .............................. 369/44.25, 133, 369/43, 44.34; 318/685, 696, 618, 608, 632, 606; 388/812, 805, 811, 806, 809, 820

[56] References Cited

U.S. PATENT DOCUMENTS

| | | | |
|---|---|---|---|
| 4,123,779 | 10/1978 | Goldschmidt | 360/73 |
| 4,271,382 | 6/1981 | Maeda et al. | 388/820 |
| 4,322,757 | 3/1982 | Hatakeyama | 360/70 |
| 4,353,016 | 10/1982 | Born | 318/254 |
| 4,371,818 | 2/1983 | Lewis | 318/254 |
| 4,418,304 | 11/1983 | Iwai | 388/812 |
| 4,485,337 | 11/1984 | Sandusky | 369/812 |
| 4,486,794 | 12/1984 | Itoh | 360/10.3 |
| 4,564,795 | 1/1986 | Parkes et al. | 318/802 |
| 4,607,358 | 8/1986 | Maeda et al. | 369/44 |
| 4,611,319 | 9/1986 | Naito | 369/133 |
| 4,633,423 | 12/1986 | Bailey | 318/632 |
| 4,641,069 | 2/1987 | Fujuoka et al. | 318/675 |
| 4,679,181 | 7/1987 | Naito | 369/44.25 |
| 4,745,494 | 5/1988 | Kaneko et al. | 358/338 |
| 4,800,325 | 1/1989 | Nakanishi | 318/605 |
| 4,815,063 | 3/1989 | Aoshima et al. | 388/812 |
| 4,988,932 | 1/1991 | Markis et al. | 318/560 |
| 5,144,214 | 9/1992 | Komatsu et al. | 318/600 |
| 5,146,440 | 9/1992 | Yamaguchi et al. | 369/44.25 |
| 5,204,601 | 4/1993 | Hirata et al. | 318/606 |
| 5,270,632 | 12/1993 | Hirota et al. | 318/799 |

*Primary Examiner*—John W. Cabeca
*Attorney, Agent, or Firm*—Sughrue, Mion, Zinn, Macpeak & Seas

[57] ABSTRACT

A spindle motor controlling circuit for controlling the rotation of an optical disk system using a constant linear velocity servo. The circuit includes a spindle motor rotation sensing circuit for generating a phase frequency in response to the rotation of the spindle motor. A speed control part of the controlling circuit includes a speed error signal generating circuit that generates speed error data indicative of a difference between the period of the phase frequency and data representing a desired spindle motor speed. A phase control part of the control circuit includes a phase coefficient pulse generating circuit, a reference phase signal generating circuit and a phase error signal generating circuit. Finally, the controlling circuit includes a driving voltage generating circuit for generating a speed driving voltage corresponding to the speed error data and a phase driving voltage corresponding to the phase error signal. The driving voltages are used for driving the spindle motor.

12 Claims, 5 Drawing Sheets

SPINDLE MOTOR CONTROLLING CIRCUIT OF AN OPTICAL DISK SYSTEM

FIELD OF THE INVENTION

The present invention relates to a spindle motor controlling circuit of an optical disk system for controlling the rotation of a disk using a constant linear velocity servo. The present disclosure is based on the disclosure of Korean Patent Application No. 92-18018 filed Oct. 1, 1992.

BACKGROUND OF THE INVENTION

Typically, data is recorded with a constant linear velocity (CLV) in an optical disk, and the data recorded therein traces the same distance during any given time. Therefore, an optical disk system controlling a spindle motor rotating a disk recorded in this manner should operate according to CLV, so that low speed rotation is performed in the outer circumference of the disk and high speed rotation is implemented in the inner circumference.

For example, in a compact disk player (CDP) and its application apparatus, since the data is recorded with CLV, the angular velocity of the disk rotation changes depending on the relative radial position of the disk's pick-up. Whenever the pick-up unit for reproducing the data recorded in the disk is shifted to another position from some previous specific position, the speed of the spindle motor rotating the disk should be regulated accordingly.

In a conventional CDP, a data clock or a bit clock generated by a reproducing part after the speed is regulated is compared with a reference clock (for example, a system clock 4.3218 Mhz) generated within the optical disk system, in order to control the speed of the spindle motor by way of a phase difference. Thus the data clock at the desired position has the same frequency as the reference clock.

However, such a controlling method for the spindle motor has disadvantages in that it takes a long time to lock the frequency of the data clock to that of the system clock. Further, if the data clock is not properly extracted at the desired position because the speed deviates from a locking range of PLL (phase locked loop) in which the CLV can be adjusted, the motor speed is in danger of diverging.

SUMMARY OF THE INVENTION

It is accordingly an object of the present invention to provide a spindle motor speed controlling circuit capable of rapidly and accurately searching for a desired sector when accessing desired position information at high speed in an optical disk system, for controlling a spindle motor using a CLV servo.

It is another object of the present invention to provide a frequency generating circuit for generating a rotation speed frequency corresponding to the rotation of a spindle motor.

It is a further object of the present invention to provide a spindle motor controlling circuit capable of achieving high-speed locking and controlling a desired phase by attaching a frequency generating circuit for generating a frequency corresponding to the rotation of a spindle motor to the spindle motor and then controlling the rotation speed and phase variation which are generated when a pickup is shifted from one location on the disk to another.

It is a still further object of the present invention to provide a spindle motor controlling circuit for controlling the rotation speed and rotation phase of a spindle motor utilizing a frequency corresponding to the rotation of the spindle motor.

It is yet another object of the present invention to provide a spindle motor speed controlling circuit for generating a speed error signal utilizing a frequency corresponding to the rotation of the spindle motor and a calculated desired reference speed.

In accordance with one aspect of the present invention, a spindle motor controlling circuit of an optical disk system includes a spindle motor rotation sensing circuit for generating a phase frequency in response to the rotation of the spindle motor, a speed error signal generating circuit for generating speed error data for a difference between the period of the phase frequency and desired speed data, a phase coefficient pulse generating circuit for generating a position phase pulse just before a shift from a current position in response to the input of the phase frequency and simultaneously generating a double edge detecting pulse by detecting the rising and falling edges of the phase frequency, a desired phase detector for generating a desired phase detecting signal when the double edge detecting pulse is counted up to a preset desired phase data in response to the position phase pulse, a reference phase signal generating circuit for setting a reference phase data corresponding to N times the desired reference speed data to one rotation period of a desired track, for counting a first clock in response to the phase position pulse and for generating a reference phase control signal when this count value reaches the reference phase data, a phase error signal generating circuit for detecting a phase difference between a current phase and a desired phase in response to the reference phase control signal, for generating a phase error signal in response to the desired phase detecting signal and for generating a preset phase error signal by the input of a phase servo control signal, and a driving circuit for generating a speed driving voltage and a phase driving voltage corresponding to the speed error data and the phase error data to drive the spindle motor.

BRIEF DESCRIPTION OF THE DRAWINGS

Further characteristics and advantages of the invention will become apparent from the detailed description hereunder, illustrated by way of non-limitative examples in the attached drawings, wherein.

DETAILED DESCRIPTION OF THE PREFERRED EMBODIMENT

Figure 1:
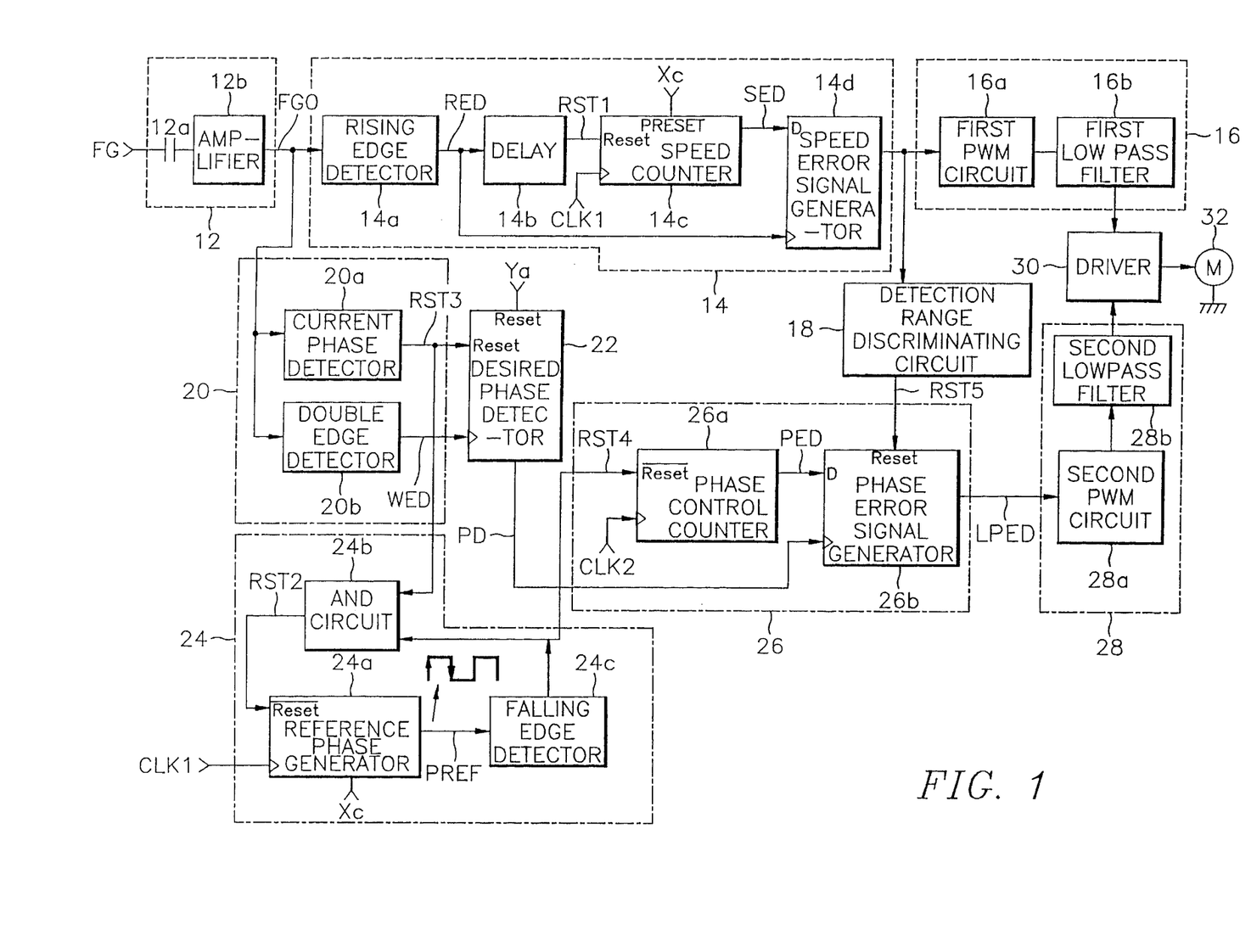
FIG. 1 is a block diagram showing a spindle motor controlling circuit of an optical disk system according to the present invention.

FIG. 1 is a block diagram showing a spindle motor controlling circuit of an optical disk system according to an embodiment of the present invention. A frequency coupling circuit 12 receiving the phase frequency generated from a frequency generator (FG) consists of a direct current blocking capacitor 12a and an amplifier 12b for amplifying the phase frequency FGO to a TTL (Transistor-Transistor Logic) level. A speed error data (SED) generating circuit 14 compares the phase frequency FGO of a motor generated from the frequency generator (FG) with a desired reference speed data Xc in response to variations in phase caused by the rotation of the spindle motor and generates the speed error data SED. A speed voltage generating circuit 16 performs pulse width modulation (PWM) of the speed error data SED generated from the SED generating circuit 14 and generates a speed driving voltage corresponding to a PWM pulse. A detection range discriminating circuit 18 produces a phase servo control signal RST5 when the speed error data SED generated from the SED generating circuit 14 exceeds a PWM detecting range. A phase coefficient pulse generating circuit 20 receiving the phase frequency FGO of the motor produces a phase position pulse RST3 just before a shift from the current position and simultaneously produces a double edge detecting pulse WED by detecting the rising and falling edges of the phase frequency FGO.

A desired phase detector 22 having preset desired phase data Ya which indicates the number of double edge detecting pulses up to a desired position from the current position generates a desired phase detecting signal PD at a period for counting the double edge detecting pulse WED up to the preset desired phase data Ya in response to the phase position pulse RST3. A reference phase signal generating circuit 24 sets reference phase data Xa corresponding to N times the desired reference speed data Xc to one rotation period of a desired track and counts the number of first clock signals CLK1 in response to the phase position pulse RST3 to produce a reference phase control signal RST4 when this count value reaches the reference phase data Xa. A phase error signal generating circuit 26 detects a phase difference signal PED between a current phase and a desired phase in response to the reference phase control signal RST4 generated from the reference phase signal generating circuit 24 and outputs the phase difference signal PED or a preset signal as a phase error signal LPED in reply to the desired phase detecting signal PD and the phase servo controlling signal RST5. A phase voltage generating circuit 28 controls the phase error signal LPED generated from the phase error signal generating circuit 26 in a PWM manner, to produce a PWM pulse and generates a phase driving voltage corresponding to the PWM pulse. A driver 30 drives a spindle motor 32 by adding the voltages generated from the speed voltage generating circuit 16 and the phase voltage generating circuit 28 respectively.

In consequence, the SED generating circuit 14 has a rising edge detector 14a for detecting the rising edge of the phase frequency FGO and for generating a rising edge detecting signal RED, a delay circuit 14b for delaying the rising edge detecting signal RED detected from the rising edge detector 14a and generating an error data generating signal RST1, a speed counter 14c for counting the input period of the phase frequency FGO with the first clock CLK1 in response to the error data generating signal RST1 generated from the delay circuit 14b and comparing the counted data of the phase frequency FGO with the preset desired reference speed data Xc, to generate the speed error data SED, and a speed error signal generator 14d for generating the speed error data SED latched to the rising edge detecting signal RED.

The speed voltage generating circuit 16 includes a first PWM circuit 16a for generating the PWM pulse by performing the PWM of the speed error data SED generated from the speed error signal generator 14d, and a first low-pass filter 16b for generating a speed voltage by low-pass-filtering the PWM pulse produced from the first PWM circuit 16a.

The phase coefficient pulse generating circuit 20 consists of a current phase detector 20a for detecting the initial falling edge of the phase frequency FGO and generating the current phase detecting signal RST3 just before a shift, and a double edge detector 20b for detecting the rising and falling edges of the phase frequency FGO and generating the double edge detecting pulse WED.

The reference phase signal generating circuit 24 has a reference phase generator 24a for setting the reference phase data Xa corresponding to N times the desired reference speed data Xc to the data of one rotation period of a desired track in an internal register and counting the first clock CLK1 of a given period in response to an operating control signal RST2 and generating the reference phase signal PREF when the counted value is ½ of the reference phase data Xa, a falling edge detector 24c for detecting the falling edge of the reference phase signal PREF and generating the reference phase control signal RST4, and an AND circuit 24b for generating the operating control signal RST2 by logic product of the current phase detecting signal RST3 and the reference phase control signal RST4.

The phase error signal generating circuit 26 has a phase control counter 26a for counting a second clock CLK2 in response to the reference phase control signal RST4 and generating the phase error data PED, and a phase error signal generator 26b for generating the phase error signal LPED in response to the desired phase detecting signal PD produced from the desired phase detector 22 and the input of the phase servo control signal RST5 generated from the detection range discriminating circuit 18.

The phase voltage generating circuit 28 has a second PWM circuit 28a for generating the PWM pulse by performing the PWM of the phase error signal LPED generated from the phase error signal generator 26b, and a second low-pass filter 28b for generating a phase driving voltage by low-pass filtering the PWM pulse generated from the second PWM circuit 28a.

The desired reference speed data Xc is generated from a microprocessor (not shown) which is a main controller of the optical disk system in order to set a reference speed. Moreover, the desired phase data Ya is also generated from the microcomputer by calculating how many double edge detecting pulses WED up to a desired position from a current position are counted.

Figure 2:
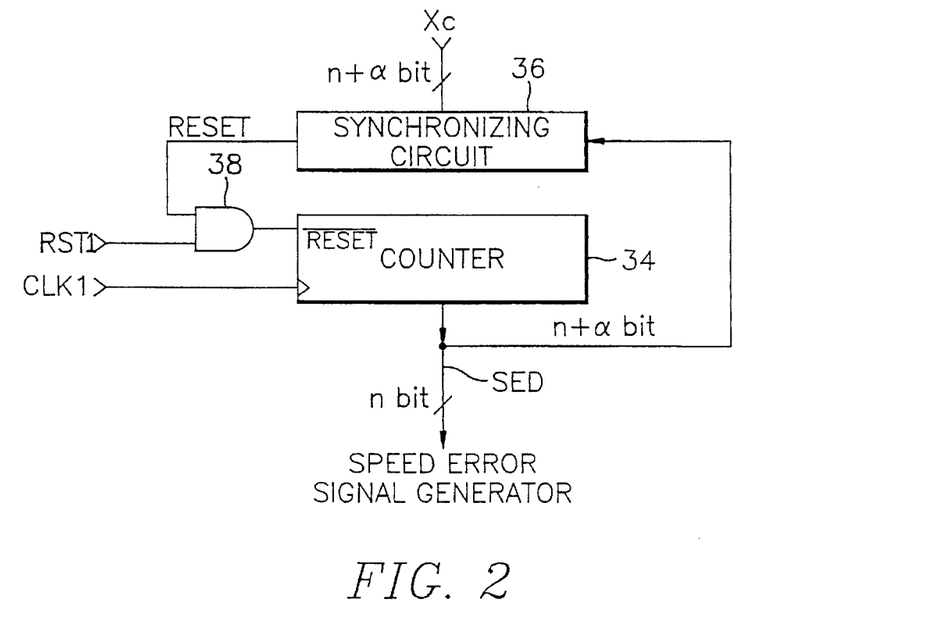
FIG. 2 is a block diagram of a speed counter employed in the spindle motor controlling circuit of FIG. 1.

FIG. 2 is a block diagram of a speed counter 14c employed in the spindle motor controlling circuit of FIG. 1. The speed counter 14c has a counter 34 for counting the first clock CLK1 when a reset input is released and generating the speed error data SED, a synchronizing circuit 36 for comparing the desired reference speed data Xc with the speed error data SED generated from the counter 34 and generating a reset signal RESET when the desired reference speed data Xc is equal to the speed error data SED, and an AND gate 38 for resetting the counter 34 in response to the inputs of the error data generating signal RST1 and the reset signal RESET.

Figure 3:
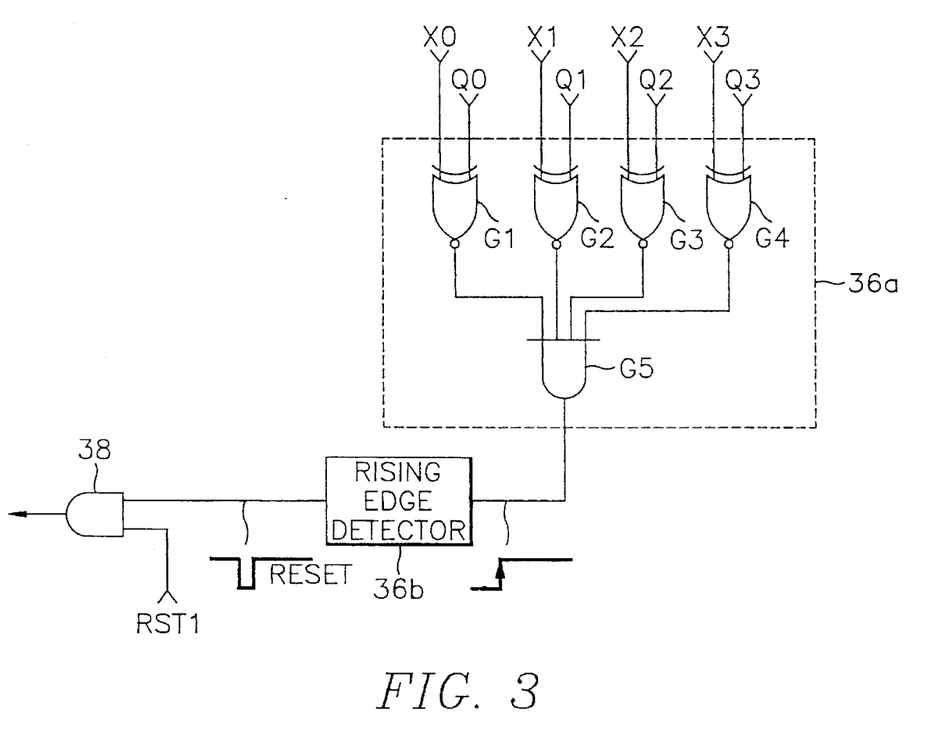
FIG. 3 is a circuit diagram of a synchronizing circuit employed in the speed counter of FIG. 2.

FIG. 3 is a circuit diagram of a synchronizing circuit 36 employed in the speed counter of FIG. 2. The synchronizing circuit 36 includes a comparing circuit 36a and a rising edge detector 36b. The comparing circuit 36a has exclusive NOR gates G1–G4 for receiving bits at the same position of the desired reference speed data Xc (X0–X3) and the speed error data SED (Q0–Q3) and generating logic "high" only when two inputs have the same logic, and an AND gate G5 for generating a speed stop signal when the outputs of the exclusive OR gates G1–G4 are all logic "high". The rising edge detector 36b detects the rising edge of the speed stop signal generated from the comparing circuit 36a and generates a one-shot reset signal RESET.

Figure 4:
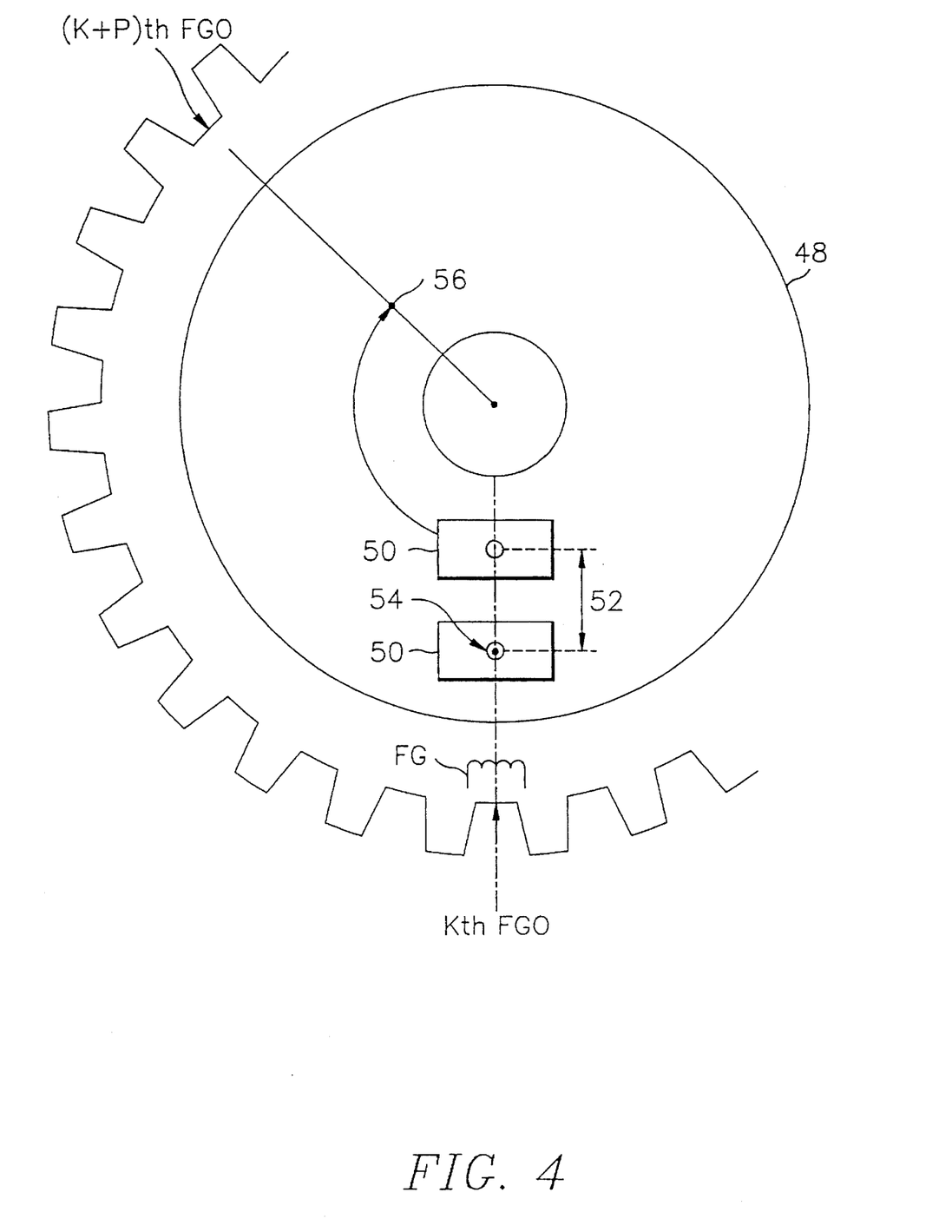
FIG. 4 is a diagram showing a traveling part of a disk with a frequency sensor according to the present invention and a frequency waveform generated before and after shift.

FIG. 4 is a diagram showing a traveling part of a disk 48 with a frequency sensor according to the present invention and a frequency waveform generated before and after a shift. There is shown the phase relation between the disk 48 before and after a current sector 54 is shifted to a desired sector 56 and the phase frequency FGO generated from the FG 58. The reference numeral 50 designates an optical pick-up unit (P/U). The FG is attached to the axis of the P/U 50.

FIGS. 5A to 5F illustrate waveforms of a speed control part of FIG. 1, and FIGS. 6A to 6K waveforms of a phase control part of FIG. 1. FIG. 5D and FIGS. 6D, 6G and 6I are not analog waveforms but diagrams illustrating a count value, quantitatively.

Referring to FIG. 4, if the disk 48 rotates, the phase frequency FGO is generated from the FG in accordance with the rotation of the disk 48. That is, the FG senses the rotation of the spindle motor 32 by a magnetic sensing or an optical sensing method and generates the phase frequency FGO. The phase frequency FGO is a signal capable of detecting an angle (phase) and velocity of the disk 48.

When the current sector 54 is shifted to the desired sector 56 while the FG is in the same axis with the P/U 50, the microcomputer for controlling the optical disk system shifts the P/U 50 at high speed by calculating the number of tracks between two sectors. The microcomputer which shifts the P/U 50 at high speed calculates the variation of the rotation speed of the spindle motor 32 generated by the shift of the track and the reference speed at a desired point, and presets the desired speed data Xc to the speed counter 14c and the reference phase generator 24a.

Figures 5A, 5B:
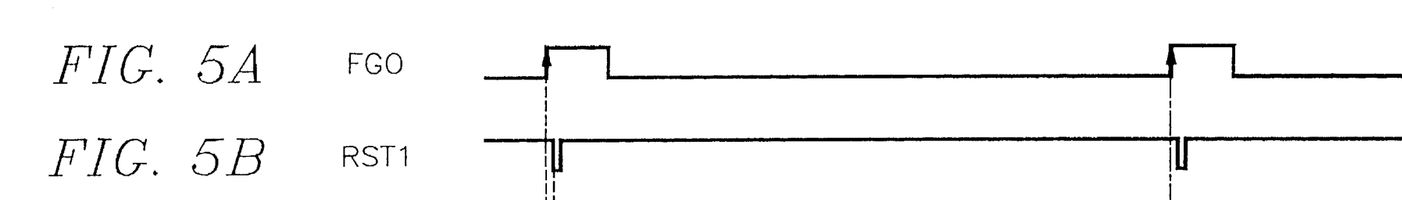
FIGS. 5A to 5F are waveform diagrams showing the operation of a speed control part of FIG. 1.

If the phase frequency FGO is generated from the FG as shown in FIG. 5A, this phase frequency FGO is applied to the rising edge detector 14a through the frequency coupling circuit 12. The rising edge detector 14a detects the rising edge of the phase frequency FGO and provides the rising edge detecting signal RED shown in FIG. 5C to the delay circuit 14b and the speed error signal generator 14d. The delay circuit 14b delays the rising edge detecting signal RED as shown in FIG. 5B and supplies the error data generating signal RST1 as the reset input to the speed counter 14c.

In this case, the speed counter 14c is reset by the error data generating signal RST1 indicated in FIG. 5B and counts the input of the clock CLK1 having a given period up to the preset desired speed data Xc, to generate the speed error data SED. The preset desired speed data Xc is calculated by the microcomputer according to the position of the P/U 50 for the radius of the disk.

Figure 5C:
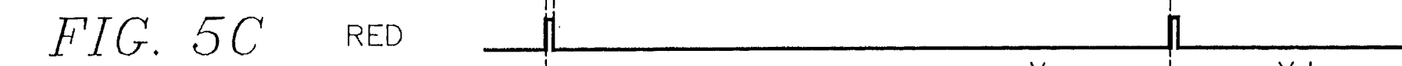
Figure 5D:
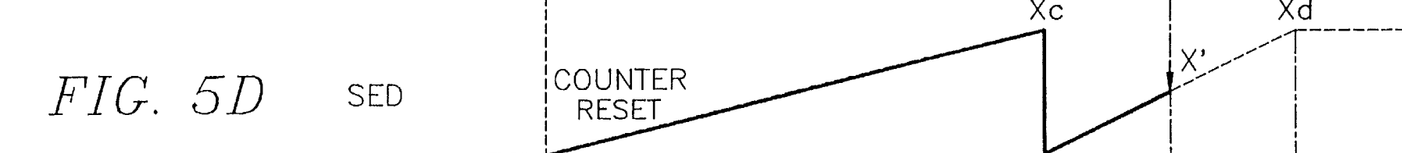
Figure 5E:
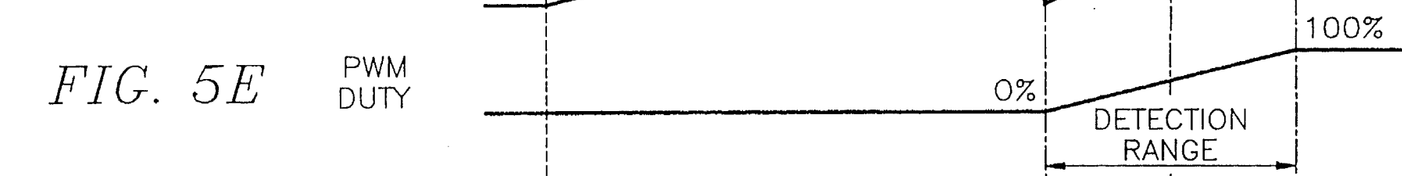

The operation of the speed counter 14c will now be specifically described with reference to FIGS. 2 and 3. If the desired speed data Xc generated from the microcomputer is applied to the synchronizing circuit 36 and the error data generating signal RST1 shown in FIG. 5B is applied to the AND gate 38, the counter 34 is reset and counts the input clock CLK1. The counted data generated from the counter 34 is provided to the synchronizing circuit 36 and the speed error signal generator 14d. The synchronizing circuit 36 compares the counted data with the desired speed data Xc and generates a reset signal RESET to the AND gate 38 when the counted data and the desired speed data Cx are the same, to reset the counter 34. The counter 34, reset by the reset signal RESET, recounts the clock CLK1. Under the state that the counter 34 generates the increased speed error data SED as shown in FIG. 5D, if the rising edge detector 14a generates the rising edge detecting signal RED as indicated in FIG. 5C by detecting the rising edge of the next phase frequency FGO, the speed error signal generator 14d consisting of a single latch circuit latches the speed error data SED generated from the counter 34 and provides the latched speed error data SED to the detection range discriminating circuit 18 and the first PWM circuit 16a.

Therefore, the speed error data generating circuit 14 is reset after counting the input clock CLK1 received within one period of the phase frequency FGO up to the preset desired speed Xc and then recounts any other clock pulse CLK1. When the rising edge detecting signal RED is inputted to the speed error signal generator 14d, the speed error signal generator 14d latches a counted value which is counted by the speed counter 14c as speed error data. Then it defines a resolution of PWM detecting range as (Xd–Xc) of FIG. 5D. That is, if the counted value (X') of the speed error data SED generated from the speed error data generating circuit 14 by the rising edge detecting signal RED of the phase frequency FGO of a next period is within the PWM detecting range Xd and this value X' is stored in the speed error signal generator 14d, PWM duty (see FIG. 5E) to be generated in the first PWM 16a is determined by the size of the value X' for the PWM detecting range Xd. For example, if the counted value X' of the speed error data SED generated from the speed error data generating circuit 14 is "0" the PWM duty becomes 0%. If the value X' is Xd/2, the PWM duty is 50%. If the value X' is equal to Xd, the PWM duty becomes 100%. When the value X' is less than the desired speed data Xc, the PWM duty is 0%, and when the value X' is greater than the PWM detecting range Xd, the PWM duty is 100%. In the latter case, the detection range discriminating circuit 18 generates the phase servo control signal RST5 of logic "low", to reset the phase error signal generator 26b.

Figure 5F:
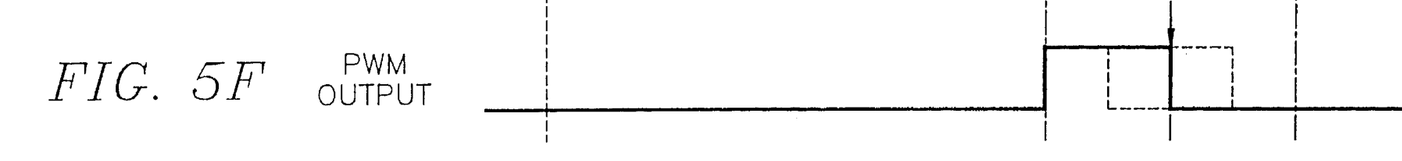

Hence, as shown in FIG. 5F, the first PWM circuit 16a generates the PWM pulse corresponding to the speed error data SED generated from the speed error signal generator 14d and provides the PWM pulse to the first low-pass filter 16b. The first low-pass filter 16b supplies the speed driving voltage to the driver 30 by low-pass filtering the PWM pulse.

Figure 6A:
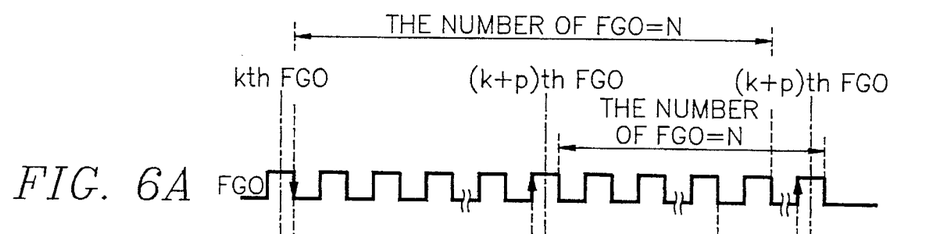
FIGS. 6A to 6K are waveform diagrams showing the operation of a phase control part of FIG. 1.
Figure 6B:
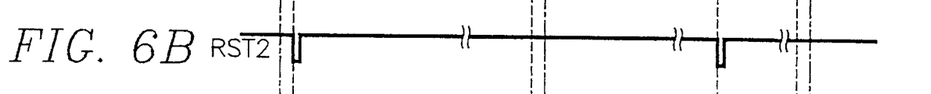
Figure 6C:
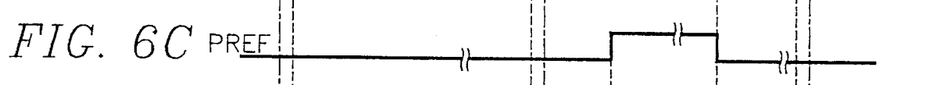
Figures 6D, 6E:
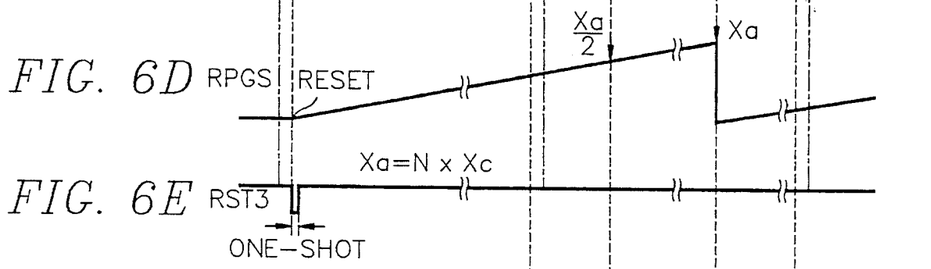

Meanwhile, if the phase frequency FGO which is generated from the FG at the present position of the P/U 50 before the spindle motor 32 is driven and received through the frequency coupling circuit 12 is the kth phase as shown in FIG. 6A, the current phase detector 20a detects the initial falling edge of the phase frequency FGO, that is, the kth phase and produces the current phase detecting signal RST3 as indicated in FIG. 6E. The double edge detector 20b detects the rising and falling edges of the phase frequency FGO successively received from the kth phase and generates the double edge detecting pulse WED.

The desired phase detector 22 having the preset desired phase data Ya is reset by the current phase detecting pulse RST3 shown in FIG. 6E and then counts the double edge detecting pulse WED generated from the double edge detector 20b. That is, the desired phase detector 22 searches for the (k+p)th phase frequency FGO by counting the rising and falling edges of the phase frequency FGO generated from the double edge detector 20b. The construction of the desired phase detector 22 is identical to that of the speed counter 14c. The preset desired phase data Ya in the desired phase detector 22 is determined from the microcomputer. That is, the microcomputer calculates the angle between the desired position sector 56 and the current sector 54 and accordingly generates a value p. After generating the value p, the microcomputer resets the preset desired phase data Ya representative of the value of (2p–1) for a desired phase in the desired phase detector 22.

Figures 6F, 6G:
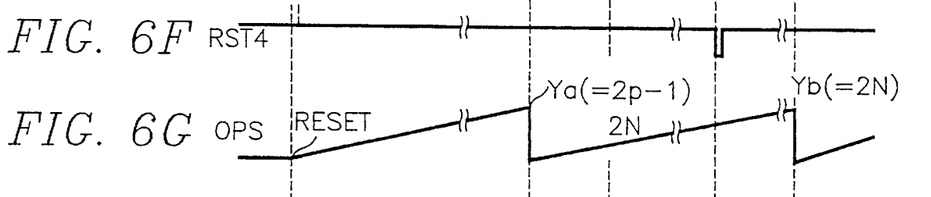
Figures 6H, 6I:
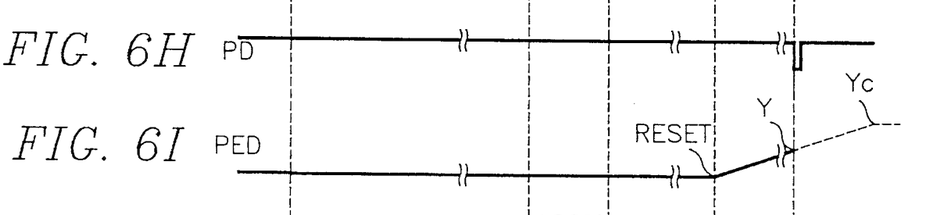
Figure 6J:
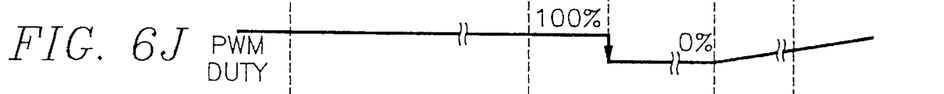
Figure 6K:
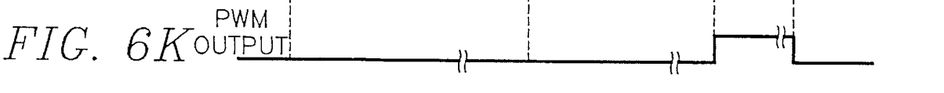

Therefore, if the desired phase detector 22 counts the double edge detecting pulse WED up to the preset desired phase data Ya, i.e. (2p–1) as shown in FIG. 6G, the desired phase detector 22 resets an internal counter and then generates the desired phase detecting signal PD whenever 2N (N is the number of phase frequency FGO) pulses are counted. In other words, once the position is fixed, the detecting signal for the desired position is constant regardless of the speed. Hence, the desired phase detector 22 counts the double edge detecting pulse WED with the period of 2N as shown in FIG. 6G and generates the desired phase detecting signal PD at every period of 2N as shown in FIG. 6H. When counting the double edge detecting pulse WED to the period of 2N, the value (2p–1) is detected because 2N is greater than the value (2p–1). However, the counter is reset once only and thereafter the counter is not reset.

The reference phase generator 24a is reset by the current phase detecting signal RST3 shown in FIG. 6E. The reference phase generator 24a sets the reference phase data Xa (Xa=Xc×N) corresponding to N times the desired speed data Xc with one rotation period of a desired track in an internal register and counts the CLK1 received at a current point of time as shown in FIG. 6D. If the counted value is Xa/2, the reference phase generator 24a transmits the reference phase signal PREF as shown in FIG. 6C. That is, if the counted value becomes Xa/2, the reference phase signal PREF is lowered. Thus, a phase reference counter within the reference phase generator 24a is reset when the reference phase signal PREF is lowered.

Therefore, the reference phase generator 24a generates the reference phase signal PREF for fixing the desired phase detecting signal PD generated from the desired phase detector 22 on an axis where the P/U 50 is located. That is, in order to control an angle difference between the current sector 54 and the desired sector 56, the reference phase signal is generated at a desired track on the basis of the position of the current sector 54. A reference pulse in which one period corresponds to one rotation at the position is produced by N-dividing the phase frequency FGO of the desired track. The reference phase generator 24a may have the same construction as the speed counter 14c.

The falling edge detector 24c for receiving the reference phase signal PREF produced from the reference phase generator 24a detects the falling edge of the reference phase signal PREF and provides the reference phase control signal RST4 shown in FIG. 6F to the AND circuit 24b and the phase control counter 26a.

The phase control counter 26a, reset by the reference phase control signal RST4, counts up the input clock CLK2 to a preset value Yc as shown in FIG. 6I and supplies a phase difference between the current phase and the desired phase, i.e. the phase error data PED to the phase error signal generator 26b. A latch circuit is employed as the phase error signal generator 26b.

The phase error signal generator 26b for receiving the phase error data PED generated from the phase control counter 26a provides the counted phase error data PED to the second PWM circuit 28a in response to the desired phase detecting signal PD produced from the desired phase detector 22. The preset value Yc of the phase control counter 26a is the resolution of the PWM detecting range in the second PWM circuit 28a.

The second PWM circuit 28a for receiving the phase error data PED generated from the phase error signal generator 26b produces the PWM pulse having the duty corresponding to the phase error data PED. If a value Y' of the phase error data PED is 0, the duty is 0% and if the value Y' is Yc/2, the duty is 50%. Moreover, if the value Y' is greater than Yc, the PWM pulse having the duty of 100% is generated because it is out of the detecting range.

In the case that the speed control part is not locked, the phase error data PED latched to the phase error signal generator 26b is broken because it is reset by the phase control signal RST5 generated from the detection range discriminating circuit 18. When the speed control part returns to normalcy, the phase part is controlled for normal conditions. If the phase error signal generator 26b is reset, the PWM duty produced from the second PWM circuit 28a is fixed at 50%.

The second low-pass filter 28b low-pass filters the PWM pulse and then supplies the phase driving voltage to the driver 30. At this time, the driver 30 adds the speed driving voltage generated from the first low-pass filter 16b to the phase driving voltage produced from the second low-pass filter 28b, to drive the spindle motor 32.

The voltage produced from the speed control part causes a rapid variation of the motor rotation speed. It is noted that the phase voltage generated from the phase control part has nearly effect on the speed and distributes the gains of the driver so as to control only the phase.

As described above, the spindle motor controlling circuit embodying the present invention controls the variation of the rotation speed and the rotation phase simultaneously using a frequency generator for generating a frequency in accordance with the phase variation of the spindle motor, with the result that data of a desired position can be accessed at high speed.

While the present invention has been shown and described with reference to certain preferred embodiments thereof, it will be understood by those skilled in the art that changes in form and details may be made without departing from the spirit and scope of the invention as defined by appended claims.

What is claimed is:

1. A circuit for controlling a spindle motor of an optical disk system, comprising:

spindle motor rotation sensing means for generating a phase frequency in accordance with an amount of rotation of said spindle motor;

means for setting a variable desired spindle motor speed;

means for setting a variable desired phase value;

speed error signal generating means for generating speed error data indicative of a difference between a period of said phase frequency and data representing said variable desired spindle motor speed;

speed driving voltage generating means for generating a speed driving voltage corresponding to said generated speed error data and for driving said spindle motor according to said generated speed driving voltage; and means for automatically controlling a phase difference between said spindle motor and said variable desired phase value when said speed error data is within a predetermined range and while said speed driving voltage generating means drives said spindle motor according to said speed driving voltage, and disabling control of said phase difference when said speed error data exceeds said predetermined range.

2. The circuit as claimed in claim 1, wherein said speed error signal generating means comprises:

a rising edge detector for detecting a rising edge of said phase frequency and for generating a rising edge detecting signal;

a delay circuit for delaying said rising edge detecting signal and thereby generating an error data generating signal;

a speed counter for counting an input period of said phase frequency with a first clock in response to said error data generating signal, for comparing the counted data of said phase frequency with desired reference speed data, and for generating said speed error data in accordance with said comparison; and a speed error signal generating circuit for providing said speed error data, latched to said rising edge detecting signal, to said speed driving voltage generating means.

3. The circuit as claimed in claim 2, wherein said speed counter comprises:

a counter for counting the first clock when a reset input is released and for generating said speed error data;

a synchronizing circuit for comparing said desired reference speed data with said speed error data and generating a reset signal when said desired reference speed data and said speed error data correspond to each other; and a counter initializing circuit for resetting said counter in response to said error data generating signal and said reset signal.

4. The circuit as claimed in claim 3, wherein said synchronizing circuit comprises:

a comparing circuit for comparing said desired reference speed data with said speed error data generated from said counter and for generating a speed stop signal when said desired reference speed data is equal to said speed error data; and a rising edge detector for detecting a rising edge of said speed stop signal and generating said reset signal.

5. The circuit as claimed in claim 1, wherein said speed driving voltage generating means comprises:

a pulse width modulation circuit for modulating a pulse width of said speed error data and thereby generating a pulse width modulation pulse; and a driving circuit for low-pass filtering said pulse width modulation pulse generated from said pulse width modulation circuit and for generating said speed driving voltage for driving said spindle motor.

6. A circuit for controlling a spindle motor of an optical disk system, comprising:

spindle motor rotation sensing means for generating a phase frequency in accordance with an amount of rotation of said spindle motor;

speed error signal generating means for generating speed error data indicative of a difference between a period of said phase frequency and data representing a desired spindle motor speed;

phase coefficient pulse generating means for generating a current-position phase pulse from said phase frequency just before said spindle motor performs a shift from a current position and for generating double edge detecting pulses by detecting rising and falling edges of said phase frequency occurring subsequent to said current-position phase pulse;

desired phase detecting means for generating a desired phase detecting signal when, in response to said current-position phase pulse, said double edge detecting pulses are counted up to a desired phase data value, said desired phase data value indicating a number of double edge detecting pulses to be counted up to arrival at a desired position after the shift is completed;

reference phase signal generating means for setting a reference phase data value corresponding to N times said data representing the desired spindle motor speed to one rotation period of a desired track, for counting a first clock in response to said current-position phase pulse, and for generating a reference phase detecting signal when the counted value reaches the set reference phase data value;

phase error signal generating means for detecting a phase difference between a current phase and a desired phase in response to said reference phase detecting signal, and for generating a phase error signal in accordance with said phase difference; and driving means for generating a speed driving voltage and a phase driving voltage, corresponding to said speed error data and said phase error signal, respectively, in order to drive said spindle motor.

7. The circuit as claimed in claim 6, wherein said reference phase signal generating means comprises:

a reference phase generating circuit for setting said reference phase data value corresponding to N times said data representing the desired spindle motor speed to data of one rotation period of a desired track in an internal register, for counting a first clock of a given period in response to an operating control signal, and for generating a reference phase signal when the counted value is ½ of said reference phase data value;

a falling edge detector for detecting a falling edge of said reference phase signal and generating said reference phase detecting signal; and a reference phase generating control circuit for generating said operating control signal in response to said current-position phase pulse produced by said phase coefficient pulse generating means and said reference phase detecting signal.

8. The circuit as claimed in claim 6, wherein said phase error signal generating means comprises:

a phase control counter for counting a second clock of a given period in response to said reference phase detecting signal and thereby generating counted phase error data; and a phase error signal generating circuit for generating said phase error signal from said counted phase error data in response to said desired phase detecting signal generated by said desired phase detecting means.

9. The circuit as claimed in claim 6, further comprising:

a detection range discriminating means for predefining a PWM detecting range and for generating a phase servo control signal when said speed error data exceeds said PWM detecting range.

10. The circuit as claimed in claim 9, wherein said phase error signal generating means comprises:

a phase control counter for counting a second clock of a given period in response to said reference phase detecting signal and thereby generating counted phase error data; and a phase error signal generating circuit for generating said phase error signal from said counted phase error data in response to said desired phase detecting signal generated by said desired phase detecting means and for generating a preset data as said phase error signal in response to said phase servo control signal.

11. A method of controlling a spindle motor of an optical disk system using a constant linear velocity servo, comprising the steps of:

generating a phase frequency in accordance with an amount of rotation of said spindle motor, by sensing rotation of said spindle motor;

setting a variable desired spindle motor speed;

setting a variable desired phase value;

generating speed error data indicative of a difference between a period of said phase frequency and data representing said variable desired spindle motor speed;

generating a speed driving voltage corresponding to said generated speed error data and driving said spindle motor according to said generated speed driving voltage; and automatically controlling a phase difference between said spindle motor and a desired phase value when said speed error data is within a predetermined range and while said speed driving voltage generating means drives said spindle motor according to said speed driving voltage, and disabling control of said phase difference when said speed error data exceeds said predetermined range.

12. A circuit for controlling a spindle motor of an optical disk system using a constant linear velocity, comprising:

generating a phase frequency in accordance with an amount of rotation of said spindle motor, by sensing rotation of said spindle motor;

generating a current position phase pulse from said phase frequency just before said spindle motor performs a shift from a current position and generating double edge detecting pulses by detecting rising and falling edges of said phase frequency occurring subsequent to said current position phase pulse;

generating a desired phase detecting signal when, in response to said current position phase pulse, said double edge detecting pulses are counted up to a desired phase data value, said desired phase data value indicating a number of double edge detecting pulses to be counted up to arrival at a desired position after the shift is completed;

setting a reference phase data value corresponding to N times said data representing the desired spindle motor speed to one rotation period of a desired track, counting a first clock in response to said current-position phase pulse, and generating a reference phase detecting signal when the counted value reaches the set reference phase data value;

detecting a phase difference between a current phase and a desired phase in response to said reference phase detecting signal, and generating a phase error signal in accordance with said phase difference; and generating a phase driving voltage, corresponding to said phase error signal, in order to drive said spindle motor.

* * * * *